United States Patent
Kurz et al.

(12) 
(10) Patent No.: US 6,268,052 B1
(45) Date of Patent: Jul. 31, 2001

(54) BIAXIALLY-ORIENTED PET FOIL FOR USE FOR SMD FOIL CAPACITORS, METHOD FOR THE PRODUCTION OF SAID FOIL AND ITS USE AS FOIL CAPACITORS IN SMD TECHNOLOGY

(75) Inventors: Rainer Kurz, Taunusstein; Annegrete Bursch, Ruedesheim; Franz Hora, Kriftel; Bodo Kuhmann, Runkel; Ulrich Schaller, Floersheim-Wicker, all of (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/269,176

(22) PCT Filed: Sep. 23, 1997

(86) PCT No.: PCT/EP97/05207

§ 371 Date: Mar. 24, 1999

§ 102(e) Date: Mar. 24, 1999

(87) PCT Pub. No.: WO98/13414

PCT Pub. Date: Apr. 2, 1998

(30) Foreign Application Priority Data

Sep. 24, 1996 (DE) .............................................. 196 39 056
Aug. 21, 1997 (DE) .............................................. 197 36 394
Aug. 21, 1997 (DE) .............................................. 197 36 398

(51) Int. Cl.[7] ............................ B32B 27/00; B32B 27/36
(52) U.S. Cl. ...................... 428/337; 428/339; 428/480; 428/910; 528/308; 528/308.1; 528/308.6; 264/288.4; 264/290.2

(58) Field of Search ..................................... 428/480, 332, 428/337, 339, 910, 34.9, 35.1; 528/308, 308.1, 308.6; 264/288.4, 290.2

(56) References Cited

U.S. PATENT DOCUMENTS

| 3,683,060 | 8/1972 | Tanabe et al. ......................... 264/289 |
| 4,042,569 | 8/1977 | Bell et al. ........................... 260/75 T |
| 4,985,537 | 1/1991 | Utsumi et al. ........................ 528/272 |

FOREIGN PATENT DOCUMENTS 0 402 861   12/1990   (EP) .

OTHER PUBLICATIONS

Tora, Derwent Publication Ltd., JP–173100, "Heat Treatment Of Biaxially Drawn Polyester Film", (Oct. 30, 1981).
Tora, Derwent Publication Ltd., JP–153988, "Optical Recording Film", (Jul. 2, 1986).

*Primary Examiner*—Vivian Chen
(74) *Attorney, Agent, or Firm*—Foley & Lardner

(57) ABSTRACT

The present invention relates to a single or multilayer biaxially oriented film having a thickness of $\leq 12$ µm, in which $T_s$ (TD) is $\geq 160°$ C., S 200 (TD) is $\leq 5\%$, S 200 (MD) is 2–5%, the shrinkage force ratio $N_s$ 220/$N_s$ 160 is $\geq 4.5$; the film fixing peak is $\geq 210°$ C.; the film density is 1.39–1.41 g/cm$^3$, and $T_s$ (TD) is the temperature at which the transverse shrinkage begins, S 200 (TD) is the shrinkage in the transverse direction (in %) at 200° C., S 200 (MD) is the shrinkage in the machine direction (in %) at 200° C., $N_s$ 220 is the shrinkage force (in N) at 220° C. and $N_s$ 160 is the shrinkage force (in N) at 160° C. in the transverse direction. The invention also relates to a method for forming the film.

20 Claims, No Drawings

BIAXIALLY-ORIENTED PET FOIL FOR USE FOR SMD FOIL CAPACITORS, METHOD FOR THE PRODUCTION OF SAID FOIL AND ITS USE AS FOIL CAPACITORS IN SMD TECHNOLOGY

The present invention relates to polyester films, in particular PET films, which, owing to their improved shrinkage properties, are particularly suitable for the production of capacitors for SMD technology. Particularly for capacitors which are used in SMD technology, films having a small thickness and heat resistance are required. This has advantages in terms of the space occupied by the capacitor and in the soldering process.

At present, PEN and PPS films are used for film capacitors in SMD technology. PEN and PPS films have a substantially higher melting point, PEN about 265° C. and PPS about 285° C., than PET films (about 255° C.) and therefore have different shrinkage characteristics. However, the high costs of such PEN and PPS films are decisively disadvantageous. It is known that PET films currently available on the market are unsuitable for the production of capacitors for SMD technology, or are suitable only to a very limited extent under special limiting conditions, such as, for example, using a capsule or with reduction of the maximum permitted soldering temperatures to about 200° C. The PET capacitors are mechanically unstable after the heating required for the production.

To ensure that PET films have the necessary heat stability, the shrinkage must be reduced, particularly in the transverse direction at high temperatures, to such an extent that the capacitors can be produced and that the capacitors are stable to the soldering bath.

According to JP-B-63/004499 (Toray), biaxially oriented polyester films having low shrinkage values are tailored so that a further heat treatment step is additionally carried out.

EP-A-0 402 861 (DHC) and JP-A-63/011326 (Toray) describe films having a very low longitudinal shrinkage. EP-A-0 402 861 describes a first heating step at from 225° C. to 260° C. with a relaxation of from 1 to 15% and a subsequent, second relaxation of from 0.01 to 10% at temperatures below 180° C. These films are disadvantageous because the longitudinal shrinkage described there is so small that the capacitors produced therefrom are not sufficiently strong. This results in poor insulation resistance.

It was the object of the present invention to provide a PET film having SMD capabilities. The film should have a very low transverse shrinkage even at high temperatures, so that the capacitors produced therefrom are mechanically stable after heating and stable to the soldering bath. In addition, the film should have the longitudinal shrinkage required for strengthening the capacitors.

This object is achieved by a biaxially oriented film having a thickness of $\leq 12\,\mu m$ and the following properties:

| | |
|---|---|
| Ts (TD) | >160° C. |
| S 200 (TD) | ≦5% |
| S 200 (MD) | 2%–5% |
| Shrinkage force ratio | |
| $N_S\,220/N_S\,160$ | ≧4.5 |
| Film setting peak | ≧210° C. |
| Film density | 1.39–1.41 g/cm³ |

The invention accordingly relates to a biaxially oriented single-layer or multilayer polyester film which can be coated on one or both sides, having a total thickness of $\leq 12\,\mu m$, Ts (TD) being the temperature (° C.) at which the shrinkage (measured by means of TMA) in the transverse direction begins, S 200 (TD) being the shrinkage (%) at 200° C. in the transverse direction, S 200 (MD) being the shrinkage (%) at 200° C. in the longitudinal direction and $N_s$ 220 being the shrinkage force (N) at 220° C. and $N_s$ 160 being the shrinkage force (N) at 160° C. in the transverse direction. The film setting peak is the maximum temperature experienced by the film (measured by means of DSC analysis).

The film according to the invention has a thickness of $\leq 12\,\mu m$, preferably $\leq 8\,\mu m$ and in particular $\leq 6\,\mu m$.

The temperature (° C.) Ts (TD) at which the shrinkage in the transverse direction begins must be ≧160° C., preferably ≧175° C., in order to prevent mechanical deformation of the resulting capacitors during the soldering process.

The transverse shrinkage of the film at 200° C. is <5%, preferably <3% and particularly preferably ≦1%, since otherwise the capacitor produced from this film is too greatly constricted on soldering.

It has proved to be particularly favorable if the transverse shrinkage of the film at 220° C. is <5%, preferably <3% and particularly preferably ≦2%, since otherwise the capacitor produced from this film is subjected to excessive mechanical deformation at high soldering temperatures.

The shrinkage force ratio $N_s\,220/N_s\,160$ in the transverse direction of the film according to the invention is ≧4.5%, particularly preferably ≧5%.

If the longitudinal shrinkage at 200° C. is outside the specification 2% ≦x≦5%, the capacitor produced from the film is no longer mechanically stable, a range of 3% ≦x≦4% having proved to be particularly favorable.

The film setting peak is ≧210° C., preferably ≧215° C. and in particular ≧220° C. This ensures that the film remains heat-stable in the further processing steps, whose temperatures are usually in the range from 220 to 250° C.

The density of the polyester used for film production is in the range from 1.39 to 1.41 g/cm³. If this value is above the specification, the film is too crystalline and, in the production of the capacitor, would lead to brittleness of the film and hence to failure of the capacitor. If it is below this range, the thermal stability (hydrolytic stability) of the film is too low.

The film according to the invention is produced from polyester raw materials. Polyester raw materials are understood as meaning compositions which for the predominant part, i.e. to an extent of at least 80% by weight, preferably at least 90% by weight, comprise a polymer selected from the group consisting of polyethylene terephthalate (PET), polyethylene naphthalate (PEN), poly-1,4-dicyclohexanedimethylene terephthalate (PCT), polyethylene naphthalate bibenzoate (PENBB) and blends of these polymers. Polyester raw materials which preferably essentially comprise ethylene terephthalate units and/or preferably up to 30 mol % of comonomer units are preferred, a variation in the glycol and/or the acid component of the comonomer units being possible. The polyesters can be prepared both by the transesterification method using the conventional catalysts, such as, for example, Zn, Ca, Li and Mn salts, or by the direct esterification method.

The polyester raw material optionally contains the additives (particles) conventionally used for improving the slip and sliding properties in the production of capacitor films, for example inorganic pigments, such as kaolin, talc, $SiO_2$, $MgCO_3$, $CaCO_3$, $BaCO_3$, $CaSO_4$, $BaSO_4$, $LiPO_4$, $Ca_3(PO_4)_2$, $Mg_3(PO_4)_2$, $TiO_2$, $Al_2O_3$, MGO, SiC, LiF or the Ca, Ba or Mn salts of terephthalic acid. However, it is also possible to add particles based on crosslinked, infusible, organic polymers, such as, for example, polystyrenes, polyacrylates or polymethacrylates. The particles are preferably used in a concentration of from 0.005 to 5.0% by weight, particularly preferably in a concentration of from 0.01 to 2.0% by weight (based on the weight of the layer). The average particle size is from 0.001 to 10 μm, preferably from 0.005 to 5 μm.

The polyester films can be produced by known processes from raw materials described above or from a combination of the above polyester raw materials with further raw materials or conventional additives in a conventional amount of from 0.1 to not more than 10% by weight, both as monofilms and as multilayer, optionally coextruded films having identical or different surfaces, one surface being, for example, pigmented and the other surface containing no pigment. Furthermore, one or both surfaces of the film may be provided with a conventional functional coating by known processes.

In the preferred extrusion process for the production of the polyester film, the molten polyester material is extruded through a slot die and quenched as a substantially amorphous prefilm on a chill roll. This film is then heated again and is stretched in the longitudinal and transverse direction or in the transverse and in the longitudinal direction or in the longitudinal, in the transverse and again in the longitudinal direction and/or transverse direction. The stretching temperatures are in general from $T_g+10°$ C. to $T_g+60°$ C., the stretching ratio for the longitudinal stretching is usually from 2 to 6, in particular from 3 to 4.5, that for the transverse stretching is from 2 to 5, in particular from 3 to 4.5, and that for any second longitudinal stretching carried out is from 1.1 to 3. The first longitudinal stretching can optionally be carried out simultaneously with the transverse stretching (simultaneous stretching). This is followed by heat-setting of the film at oven temperatures of from 200 to 260° C., in particular from 220 to 250° C. What is decisive for the production of the film according to the invention is the actual temperature experienced by the film and not the ambient temperature in the production process. For example, at a very high speed of the production machine, the oven temperature, i.e. the ambient temperature, may be considerably higher than the temperature actually experienced by the film while passing through this oven. The maximum temperature actually experienced by the film during its production process can be determined by means of DSC analysis on a finished film. In the case of the film according to the invention, this temperature, measured by means of DSC analysis, is ≧210° C., preferably ≧215° C., particularly preferably ≧220° C., corresponding to the soldering temperature used in the SMD process. In the fixing zone, the film is relaxed by a total of from 5 to 15% in the transverse direction. In addition to this total relaxation of 5–15%, the relaxation rate, which according to the invention is <20%, is decisive. This is very important for adjusting the shrinkage in the transverse direction. The relaxation rate is the quotient of the relaxation in % and the time in s in which the relaxation takes place.

The relaxation can be effected in a plurality of discrete steps but also in one step, the relaxation in a plurality of steps, in particular over a relatively long distance, being preferred. A relaxation rate of <5%/s is particularly advantageous, and as large a part as possible of the relaxation should take place at temperatures ≦233° C., preferably even at temperatures <210° C. It has proved particularly advantagous if at least 0.7% of the relaxation takes place at temperatures <210° C. High relaxation rates and high relaxation temperatures lead to a smaller reduction in the transverse shrinkage in combination with a substantial reduction in the longitudinal shrinkage, which is disadvantageous for the reasons mentioned. Thereafter, the film is cooled and rolled up. The process described here for the production of polyester films having reduced transverse shrinkage is applicable not only to polyester but also to other thermoplastic polymers.

The invention is illustrated in more detail below with reference to Examples.

EXAMPLES

The following methods of measurement were used for characterizing the films obtained:

Shrinkage

The thermal shrinkage was determined on 10 cm squares.

The samples ($L_0$) are accurately measured and are heated for 15 minutes in a through-circulation oven at the respective stated temperature. The samples (L) are removed and are accurately measured at room temperature.

$$\text{Shrinkage } (\%) = \frac{L_0 - L}{L_0} \cdot 100$$

Initial Temperature of the Shrinkage

To determine the temperature $T_s$ at which the shrinkage of the film begins, the TMA is carried out using an apparatus from Mettler. The 10 mm×6 mm samples are measured at a heating rate of 10 K/min and a force of 5 mN.

Shrinkage Force

The shrinkage force as a function of temperature is determined by means of thermomechanical analysis using the Thermofil-M apparatus. The 100×8 mm samples are measured at a heating rate of 10 K/min and an initial stretching force of 2 cN.

Film setting peak

The film setting peak is determined by means of DSC analysis using an apparatus from Du Pont. In this first heating up at a heating rate of 20 K/min, an endothermic peak occurs.

Density

Densities are determined in accordance with ASTM D 1505-68 by immersing samples in density gradient columns. $CC_4$/heptane mixtures are used for producing the density gradient column.

Example 1

PET chips were dried at 160° C. and extruded at from 280 to 310° C. The molten polymer was taken off from a die by means of a take-off roll. The stretched film was stretched by a factor of 3.8 in the machine direction at 115° C. Transverse stretching by a factor of 4.0 was effected in a frame at 120° C. The film was then heat-set, the film setting peak determined being 226° C. The film was relaxed by 6% in uniform steps in the transverse direction at a relaxation rate of 2.2%/s.

Comparative Example 1

A biaxially oriented film was produced as described in Example 1, except that the film was heat-set at 210° C. (=film setting peak).

Comparative Example 2

A biaxially oriented film was produced as described in Example 1, but without relaxation of the film in the transverse direction.

Comparative Example 3

A biaxially oriented film was produced as described in Example 1, but the film was relaxed by 2.5% in the transverse direction.

Example 2

A biaxially oriented film was produced as described in Example 1, but the film setting peak determined was 242° C. in this case and the film was relaxed by 11% in the transverse direction.

Comparative Example 4

A biaxially oriented film was produced as described in Example 2, but without relaxation of the film in the transverse direction.

Comparative Example 5

A biaxially oriented film was produced as described in Example 2, but the film was relaxed by 2.5% in the transverse direction.

The properties of the films from the Examples are summarized in Table 1.

TABLE 1

| Film type | Density g/cm³ | S 180 (MD)[1] % | Ts (TD) ° C. | S 200 (TD) % | S 200 (MD) % | S 220/ S 160 | Soldering bath stability of the capacitor |
|---|---|---|---|---|---|---|---|
| Example 1 | 1.4007 | 2.4 | 185 | 1.4 | 4.0 | 13.3 | 0 |
| Example 2 | 1.4032 | 1.9 | 200 | −0.1 | 2.8 | 5.2 | 0 |
| Comparative Example 1 | 1.4003 | 2.6 | 160 | 1.8 | 6.2 | 3.8 | x |
| Comparative Example 2 | 1.4009 | 2.4 | 95 | 7.6 | 3.8 | 1.4 | x |
| Comparative Example 3 | 1.4007 | 2.6 | 95 | 4.1 | 5.5 | 2.9 | x |
| Comparative Example 4 | 1.4039 | 1.8 | 100 | 6.8 | 2.6 | 1.6 | x |
| Comparative Example 5 | 1.4033 | 1.9 | 105 | 3.6 | 2.7 | 2.8 | x |
| Comparative Example EP-A-0 402 861 | 1.4067 | 0.7 | 235 | −0.8 | 1.3 | 1.9 | x |

[1] Heating time 30 min

What is claimed is:

1. A single-layer or multilayer biaxially oriented polyethylene terephthalate film having a thickness of $\leq 12$ μm, where

| $T_s$ (TD) is | $\geq 160°$ C. |
| $S$ 200 (TD) is | $\leq 5\%$ |
| $S$ 200 (MD) is | $2 - 5\%$ |
| Shrinkage force ratio $\dfrac{N_s\,200}{N_2\,160}$ is | $\geq 4.5$ |
| Film setting peak is | $\geq 210°$ C. (measured by means of DSC analysis) |
| Film density is | $1.39 - 1.41$ g/cm³, | and $T_s$ (TD) is the temperature at which the transverse shrinkage begins (measured by means of TMA), S 200 (TD) is the shrinkage in the transverse direction (in %) at 200° C., S 200 (MD) is the shrinkage in the machine direction (in %) at 200° C., $N_s$ 220 is the shrinkage force (in N) at 220° C. and $N_s$ 160 is the shrinkage force (in N) at 160° C. in the transverse direction.

2. The polyethylene terephthalate film as claimed in claim 1, wherein S 200 (TD) is $\leq 3\%$.

3. The polyethylene terephthalate film as claimed in claim 1 wherein S 200 (TD) is $\leq 1\%$.

4. The polyethylene terephthalate film as claimed in claim 1, wherein the film setting peak is $\geq 215°$ C.

5. The polyethylene terephthalate film as claimed in claim 1, wherein the film setting peak is $\geq 220°$ C.

6. The polyethylene terephthalate film as claimed in claim 1, wherein one or both surfaces of the film are coated with a functional layer.

7. A process for the production of a polyethylene terephthalate film as claimed in claim 1, wherein a molten polyethylene terephthalate melt is extruded onto a chill roll and then stretched sequentially in the longitudinal and then in the transverse direction or in the transverse and then in the longitudinal direction or simultaneously in the longitudinal and in the transverse direction and is optionally stretched then once again in the longitudinal and/or transverse direction and is then heat-set at from 200 to 260° C., the film being relaxed by from 5 to 15% at a relaxation rate of <20%/s during the heat-setting and the film experiencing a maximum temperature of $\geq 210°$ C. (measured by means of DSC analysis on the finished film) during the production process.

8. The process according to claim 7, wherein the relaxation rate is <10%/s.

9. The process according to claim 7, wherein the relaxation rate is <5%/s.

10. An SMD capacitor having a polyethylene terephthalate film as claimed in claim 1.

11. The polyethylene terephthalate film as claimed in claim 1, wherein the transverse shrinkage of the film at 220° C. (S 220 (TD)) is $\leq 3\%$.

12. The polyethylene terephthalate film as claimed in claim 1 wherein the transverse shrinkage of the film at 220° C. (S 220 (TD)) is $\leq 2\%$.

13. A single-layer or multilayer biaxially oriented polyester film having a thickness of $\leq 12$ μm, where

| $T_s$ (TD) is | $\geq 160°$ C. |
| $S$ 200 (TD) is | $\leq 5\%$ |
| $S$ 200 (MD) is | $2 - 5\%$ |
| Shrinkage force ratio $\dfrac{N_s\,200}{N_2\,160}$ is | $\geq 4.5$ |
| Film setting peak is | $\geq 210°$ C. (measured by means of DSC analysis) |

-continued $$\text{Film density is} \quad 1.39-1.41\,\text{g/cm}^3,$$

and $T_s$ (TD) is the temperature at which the transverse shrinkage begins (measured by means of TMA), S 200 (TD) is the shrinkage in the transverse direction (in %) at 200° C., S 200 (MD) is the shrinkage in the machine direction (in %) at 200° C., $N_s$ 220 is the shrinkage force (in N) at 220° C. and $N_s$ 160 is the shrinkage force (in N) at 160° C. in the transverse direction.

14. The polyester film as claimed in claim 13, wherein S 200 (TD) is ≦3%.

15. The polyester film as claimed in claim 13, wherein S 200 (TD) is ≦2%.

16. The polyester film as claimed in claim 13, wherein the film setting peak is ≧215° C.

17. The polyester film as claimed in claim 13, wherein the film setting peak is ≧220° C.

18. The polyester film as claimed in claim 13, wherein one or both surfaces of the film are coated with a functional layer.

19. The polyester film as claimed in claim 13, wherein the polyester is selected from the group consisting of polyethylene terephthalate, polyethylene naphthalate, poly-1,4-dicyclohexanedimethylene, polyethylene naphthalate bibenzoate and mixtures thereof.

20. An SMD capacitor having a polyester film as claimed in claim 13.

* * * * *